UNITED STATES PATENT OFFICE.

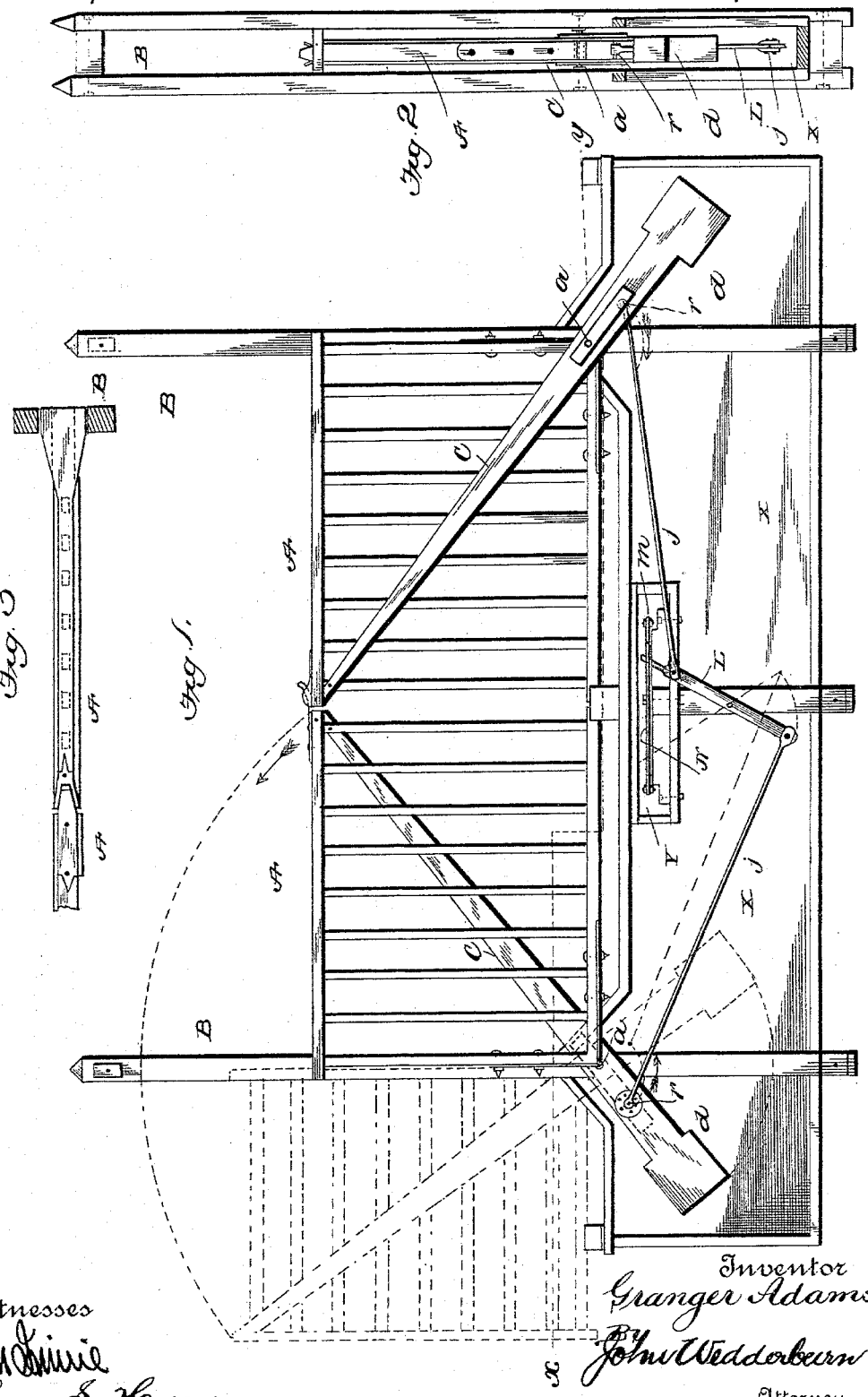

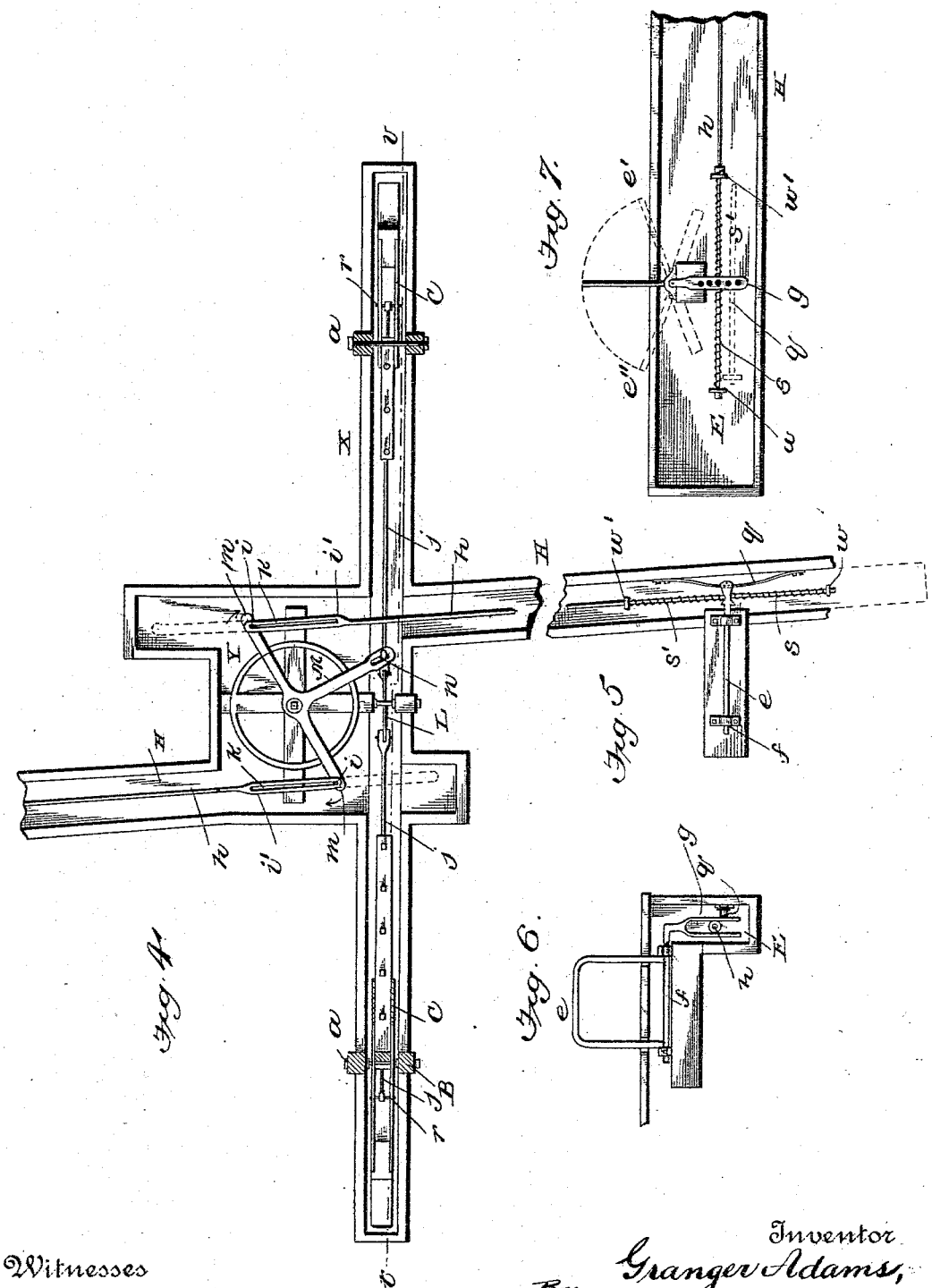

GRANGER ADAMS, OF THE UNITED STATES ARMY.

GATE.

SPECIFICATION forming part of Letters Patent No. 511,034, dated December 19, 1893.

Application filed June 15, 1893. Serial No. 477,624. (No model.)

*To all whom it may concern:*

Be it known that I, GRANGER ADAMS, of the United States Army, residing at Presidio, State of California, have invented certain new and useful Improvements in Gates; and I do hereby declare the following to be a full, clear, and exact description of the invention, such as will enable others skilled in the art to which it appertains to make and use the same.

My invention relates to automatic road gates of that class which are so constructed as to be opened and closed, either by hand or wheel power, without requiring a driver to dismount from his vehicle, and the objects of my improvement are, first, to provide a gate which will not in the least inconvenience the driver, but will be operated entirely by the action of the vehicle wheel; second, to provide a gate in which the motion, both in opening and closing, will result directly from the application of the force brought to bear on the operating mechanism, and be independent of the action of gravity; third, to obviate the tendency of the posts to sag inward, in consequence of the weight of the gates; fourth, to provide a gate in which the effect of wind pressure, in retarding or accelerating motion will be reduced to a minimum.

With these and other objects in view, the invention consists of the construction and arrangement of the parts as will be more fully hereinafter described and claimed.

In the drawings:—Figure 1, is a front elevation, and vertical section on line —$t$ $v$— Fig. 4; Fig. 2, an end elevation of gate and posts; Fig. 3, a horizontal plan of top of gate and section of posts; Fig. 4, a horizontal plan, and section through pivot on line—$x$ $y$— Fig. 1; Fig. 5, a plan of wheel lever, showing spiral springs and portion of driving rod; Fig. 6, a front elevation of wheel lever; Fig. 7, an end elevation of wheel lever, showing portion of driving rod and the spiral springs.

Similar letters refer to similar parts throughout all the views.

The gate, Fig. 1, is composed of two single gates, A A, each hung on a horizontal axis, $a$, at the lower outer angle, and rotating in a vertical plane between double posts, B B, through an arc of ninety degrees. The dotted lines in Fig. 1, indicate the position of one of the gates when open. Each single gate has a diagonal brace C, as shown, extending from the upper inner angle, outward and downward beyond the axis. This brace carries at its lower extremity, $a$, counterpoise $d$, of sufficient weight to balance the gate. The counterpoise thus arranged swings in the gate pit X, and its center of gravity being on the opposite side of the axis from the center of gravity of the gate, the two are in equilibrium at all points of their revolution about that axis; in consequence thereof the gates open and close without shock, and to produce rotation, only sufficient force is required to overcome inertia and friction.

Motion is communicated to the gates, by the carriage wheel striking and rotating a wheel lever $e$, about its axis $f$, and this wheel lever has an arm $g$, extending below the axis, and with the said axis, inclosed in the pit E, below the surface of the roadway. The arm $g$, is slidingly connected with the driving rod $h$, which extends beneath the roadway, in the boxing H, to the gateway, and which may be of any desired length, allowing space between lever and gate for a four-horse or longer team, and on either side of the said sliding connection with the arm $g$, the driving rod is encircled by spiral springs $s$ $s'$ which rest against the shoulders $w$ $w'$ at their outer ends, and relieve the entire mechanism from all shock, due to the blow of the wheel of the vehicle against the wheel lever. The rods $h. h.$, have sliding connection at one end with the lever M by means of slots $h'$ formed therein and pins $i. i.$ carried by the said lever and engaging said slots, and at their opposite ends the said rods $h, h,$ have a sliding connection with the depending arms of the wheel irons. The arms $g$, are perforated, so that the attachment as shown in Fig. 7, may be made at various points as indicated by dotted lines, with the wheel iron mechanism to accommodate the position of the said rods $h$.

The wheel lever and driving rod at rest, with the gate opened or closed, are in the position shown by the full lines in Fig. 7, and returned to that position, after rotation, by the weight of the driving rod hanging upon the arm $g$. The dotted lines in Fig. 7 show the positions $e'$ and $e''$ of the wheel lever in opening and closing the gate respectively. A friction spring $q$, attached to the boxing of the wheel lever pit E, opposite the arm g, prevents the wheel lever passing the vertical when released by a wheel, and the arm g, passes the spring freely in either direction when force is applied to the wheel lever, sufficient friction being developed between the two when in contact, to stop the former in its proper position when recovering after the force is removed. The driving rod h, terminates at its other extremity in a slot k, of suitable length, and is connected with the end of one arm m, of the double bell crank lever M. A bolt i, screwed firmly into the arm m, slides freely in the slot k.

The above described wheel lever and driving rod, with all their connections, are in duplicate, one being placed on either side of the gateway. The bell crank lever M, moves about its axis in a horizontal plane, within its chamber Y, under the roadway, as indicated by arrows in Fig. 4, and changes the direction of the motion ninety degrees, transmitting it directly to the center lever L, which operates in a vertical plane, in the gate pit X, and the upper end of which passes through, and moves freely in a slot n, in the middle arm of the bell crank lever, when the two levers revolve about their respective axes; connecting rods j j attached to the center lever L, on opposite sides of its axis, and at equal distances from it, are hinged to the diagonal braces C, below their axes at r r.

The practical operation of the above described mechanism is as follows: The gate being closed, and either wheel lever in the position e, Fig. 7 being rotated toward the gateway—as by an approaching vehicle—the arm g, is carried in the opposite direction or from the gate; the applied force compresses the spring s, nearest the end of the driving rod. This spring presses against the shoulder w, and gradually pulls the driving rod in the direction from the gate, until the compression of the spring is relieved. This motion of the driving rod moves the bell crank lever M, and also the center lever L, about their axes, and the latter, through the connecting rods j j, draws the lower ends of the diagonal braces C C, downward and inward, all as shown by dotted lines and arrows in Figs. 1 and 4, thus rotating the gates upward and outward through an angle of ninety degrees, and leaving the gateway entirely clear. As the above described motion is imparted to the bell crank lever M, by either of the two driving rods, the bolt i, which connects the other driving rod with its arm m, slides freely in the slot k, of that rod, to a new position i' at the other end of the slot. As soon as the pressure, which causes the rotation of the wheel lever is removed, the lever resumes its vertical position, the slot k, permitting the rod to slide freely past the bolt i, so that when the wheel lever is vertical, the inner end of the slot is in contact with the bolt in its new position i'. The gate now being open, and the bolts i i, in the positions i' i', at the inner ends of the slots k, either wheel lever being rotated from the gate, as by a receding vehicle, reverses the motion above described, and closes the gate.

This method of hanging and operating the single gate, provides a gate in which the tendency of the posts to sag inward in consequence of the weight of the gate acting upon them, is obviated, because the weight of the gates in my construction, whether the gates be at rest or in motion, being applied to the post through the horizontal axes placed as shown, acts only in a vertical direction.

My construction further provides a gate in which the effect of wind pressure in rotating or accelerating motion, is reduced to a minimum, for the reason that it presents the least possible surface to the action of the wind while opening or closing, and moreover as the two single gates rotate in unison, but in opposite directions, the effect of the wind pressure tending to retard or accelerate the motion of either, is neutralized by its contrary effect upon the other.

Changes in the minor details of construction together with variations in the proportion of the several parts may be made without departing from the spirit of the invention or extending beyond the scope of the subject matter claimed.

Having thus described my invention, what I claim is—

1. In an automatic gate, the combination with the vertically swinging gates A. A., having diagonal braces C attached to said gates, of connecting rods j, j, movably attached to the lower portions of said braces below their pivot points, a lever L, to which the inner ends of the said connecting rods are pivotally attached above and below the pivotal point of the said lever, a double bell crank, having arms m. m., carrying pins i, i, and an arm n, with a slot in the end thereof, which is adapted to be engaged by the upper end of the said lever L, rods h, h, with slotted ends engaging the said pins i, i, arms g, connected to the opposite ends of the said rods, and levers e, e, adapted to be engaged by the vehicle wheels and operate the said arms g, substantially as described.

2. In an automatic gate, the combination with the vertically swinging gates pivoted at their lower ends, of diagonal braces attached to said gate, connecting rods j, j, movably secured at their outer ends to said braces, a lever L to which the inner ends of said rods are movably attached, a double bell crank lever M, having a slotted arm n engaged by the upper end of said lever and arms m, m, with pins i, i, thereon, rods h, h, having inner slotted ends engaging the said pins i. i. and provided with stops w. w. and w', w', springs s, s', between the said stops, arms g connected to said springs and levers e, e, for actuating said arms, substantially as described.

3. In an automatic gate, the combination with the vertically swinging gates A, A, having diagonal braces, the connecting rods j, j, movably attached to the lower portions of said braces at their outer ends, a lever L to which the inner ends of said connecting rods are pivotally attached, a double bell crank lever M having arms $m, m$, with pins $i, i$, thereon, and an arm $n$, with a slot therein and adapted to be engaged by the upper end of the said lever L, slotted rods $h, h$, engaging the said pins $i, i$, and having stops $w, w$, and $w', w'$, springs $s, s'$, engaging said rods between the stops, arms $g. g.$ having said springs $s, s'$, attached thereto, springs $q, q$, secured within the pit E and bearing against the said arms and levers $e, e$, all arranged as and for the purposes set forth.

In testimony whereof I have signed this specification in the presence of two subscribing witnesses.

GRANGER ADAMS.

Witnesses:
JOHN D. MILEY,
THOMAS W. WINSTON.